United States Patent
Mou et al.

(10) Patent No.: US 6,181,916 B1
(45) Date of Patent: Jan. 30, 2001

(54) COMMUNICATION SYSTEM AND MODE-CHANGING METHOD FOR SAME

(75) Inventors: Michael Mou; Chung Chang Chen, both of Tu-Cheng (TW)

(73) Assignee: DBTEL Incorporated, Taipei Hsien (TW)

(*) Notice: Under 35 U.S.C. 154(b), the term of this patent shall be extended for 0 days.

(21) Appl. No.: 09/140,890

(22) Filed: Aug. 27, 1998

(51) Int. Cl.[7] .................................................. H04Q 7/20
(52) U.S. Cl. .......................... 455/57; 455/574; 455/88; 455/63; 320/124
(58) Field of Search .................................. 455/421, 419, 455/420, 88, 63, 67.3, 573, 574; 320/124, 113

(56) References Cited

U.S. PATENT DOCUMENTS

| | | | |
|---|---|---|---|
| 5,111,499 | * 5/1992 | Umemoto et al. | 455/462 |
| 5,363,430 | * 11/1994 | Yamagata et al. | 455/464 |
| 5,426,690 | * 6/1995 | Hikuma et al. | 455/411 |
| 5,867,798 | * 2/1999 | Inukai et al. | 455/573 |

* cited by examiner

Primary Examiner—Daniel S. Hunter
Assistant Examiner—Alan T. Gantt
(74) Attorney, Agent, or Firm—Rosenberg, Klein & Lee

(57) ABSTRACT

A communication system includes a primary unit transmitting a first signal at a first instance, receiving a second signal at a second instance and energized by a power source having a voltage level, a secondary unit transmitting a third signal at a first instance, receiving a fourth signal at a second instance, and having a first communication mode and a second communication-shut mode, and a mode-changing device enabling the primary unit to generate a mode-changing signal to be received by the secondary unit for changing the secondary unit from the first communication mode into the second communication-shut mode when the voltage level falls below a specific value. A mode-changing method for such communication system is also provided.

7 Claims, 4 Drawing Sheets

COMMUNICATION SYSTEM AND MODE-CHANGING METHOD FOR SAME

FIELD OF THE INVENTION

The present invention relates to a communication system, and more particularly to a communication system having a primary unit and a secondary unit.

BACKGROUND OF THE INVENTION

The radio (or wireless) telephone having separable base and handset is extensively used since the user is free from being unnecessarily unduly confined to a reletively limited space. In use, the handset, however, will be noised when:
1) The handset is out of range;
2) The base has a power failure or an interrupted power; or
3) There exists a noise source.
As shown in FIG. 1, there is shown a conventional radio telephone in which the base includes a power-stabilizing circuit 11, a digital controller or central processing unit (CPU) 12, a radio frequency transmitting module 13 including a transmitting driver 131 and a transmitting amplifier 132, a transmission signal processor 24, a transmission data processor 25, a receiving data processor 26, a receiving signal processor 27 and a receiver 28. Likewise, the handset includes a receiver 14, a receiving signal processor 15, an amplifier 16, a speaker 17, an antenna 18, a receiving data processor 19, a transmitting amplifier 20, a transmitting driver 21, a transmission signal processor 22, a transmission data processor 23, a digital controller or CPU 191, a display 192 and a keypad 193.

Upon power failure or interruption of the base, there is no signal transmitted from radio frequency transmitting module 13. Nevertheless, the handset is still powered on which means that receiver 14, receiving signal processor 15 and audio amplifier 16 are still in a working mode through which any signal including a noise can transmit to speaker 17 which will sound to the user only the unpleasant amplified noise since the carrier wave has disappeared through the power failure or interruption of the base. As described above, there are three noise sources. The user will be bothered to inevitably try to redial the telephone in vain if he or she is not able to quickly get alert to the fact the base is suffering from a power failure or interruption.

It is therefore tried by the applicant to deal with the above situation, i.e. the base has a power failure or an interrupted power, encountered by the prior art.

SUMMARY OF THE INVENTION

It is therefore an object of the present invention to provide a communication system being user friendly.

It is further an object of the present invention to provide a communication system capable of freeing the manufacturer from being mistakenly by the user as a poor product source.

It is another object of the present invention to provide a mode-changing method for a communication system.

According to the present invention, a communication system includes a primary unit transmitting a first signal at a first instance, receiving a second signal at a second instance and energized by a power source having a voltage level, a secondary unit transmitting a third signal at a first instance, receiving a fourth signal at a second instance, and having a first communication mode and a second communication-shut mode, and a mode-changing device electrically connected to the primary unit and enabling the primary unit to generate a mode-changing signal to be received by the secondary unit for changing the secondary unit from the first communication mode into the second communication-shut mode when the voltage level falls below a specific value.

Preferably the mode-changing device includes a power detector electrically connected to the power source for detecting the voltage level, and outputs a first voltage when the voltage level is higher than the specific value and a second voltage when the voltage level is lower than the specific value. Certainly, the first voltage can be a working voltage of the primary unit and the second voltage can be 0.

Preferably the mode-changing device further includes a timer which begins to count a time period during which the voltage level is kept below the specific value so that a surging phenomenon can be avoided. Certainly, the primary unit can transmit the mode-changing signal to the secondary unit when the timer has counted up the time period.

Normally, the primary unit further includes a digital controller or CPU in which the timer is built.

Preferably the secondary unit further includes a display for displaying the secondary unit is in the communication-shut mode in which the noise cannot be heard and the secondary unit is uncommunicable.

Certainly, the primary unit can be a base of a radio telephone and the secondary unit can be a handset of the radio telephone.

According to another aspect of the present invention, a mode-changing method for a communication system including a primary unit transmitting a first signal at a first instance, receiving a second signal at a second instance and adapted to be energized by a power source having a voltage level, and a secondary unit transmitting a third signal at a first instance, receiving a fourth signal at a second instance and having a first communication mode and a second communication-shut mode includes the following steps of a) detecting said voltage level, b) generating a mode-changing signal when the voltage level falls below a specific value, and c) changing the secondary unit from the first communication mode into the second communication-shut mode in response to the mode-changing signal.

The present invention may best be understood through the following descriptions with reference to the accompanying drawings, in which:

DETAILED DESCRIPTION OF THE PREFERRED EMBODIMENT

Figure 1:
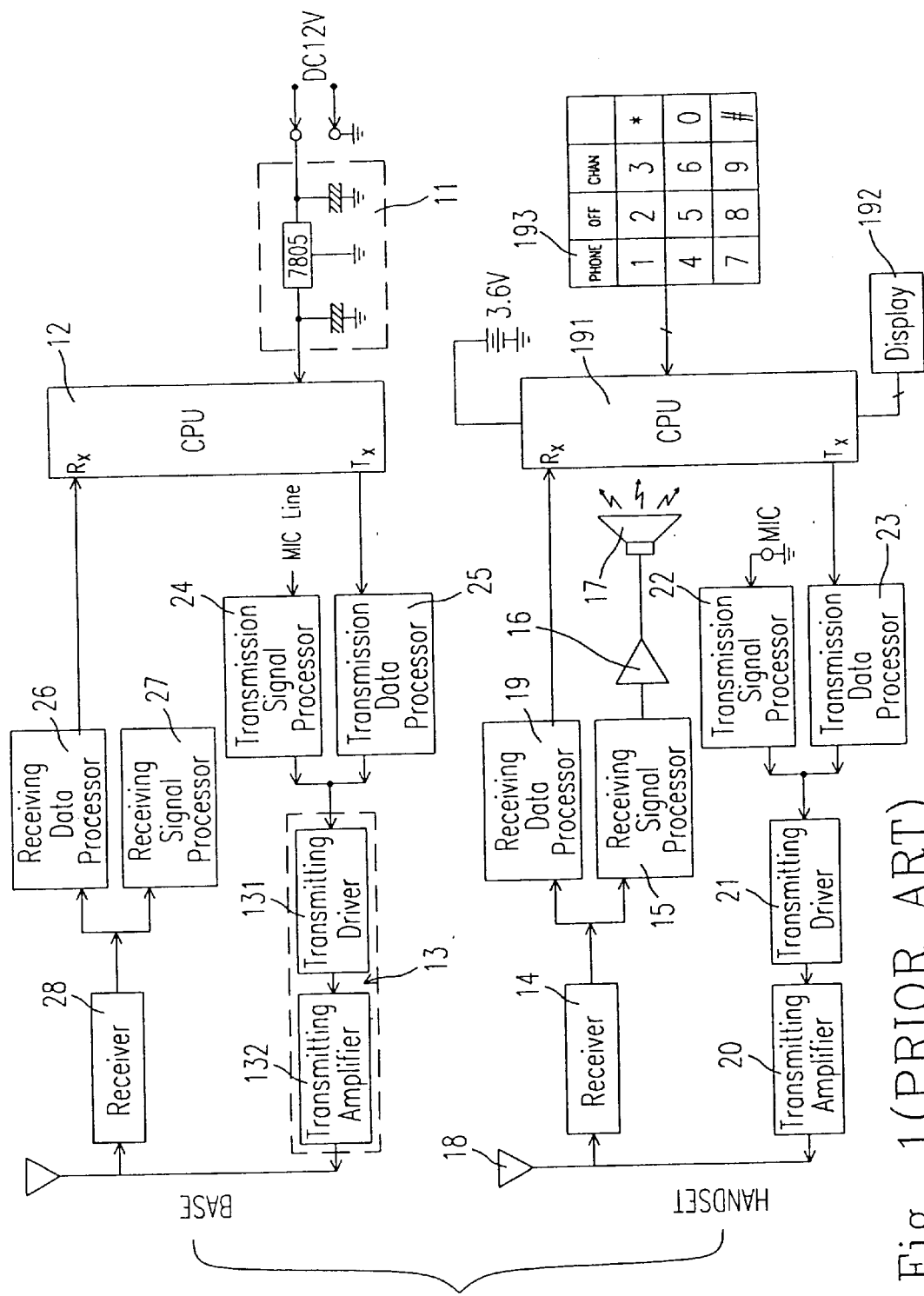
FIG. 1 is a block diagram showing a conventional radio telephone.
Figure 2:
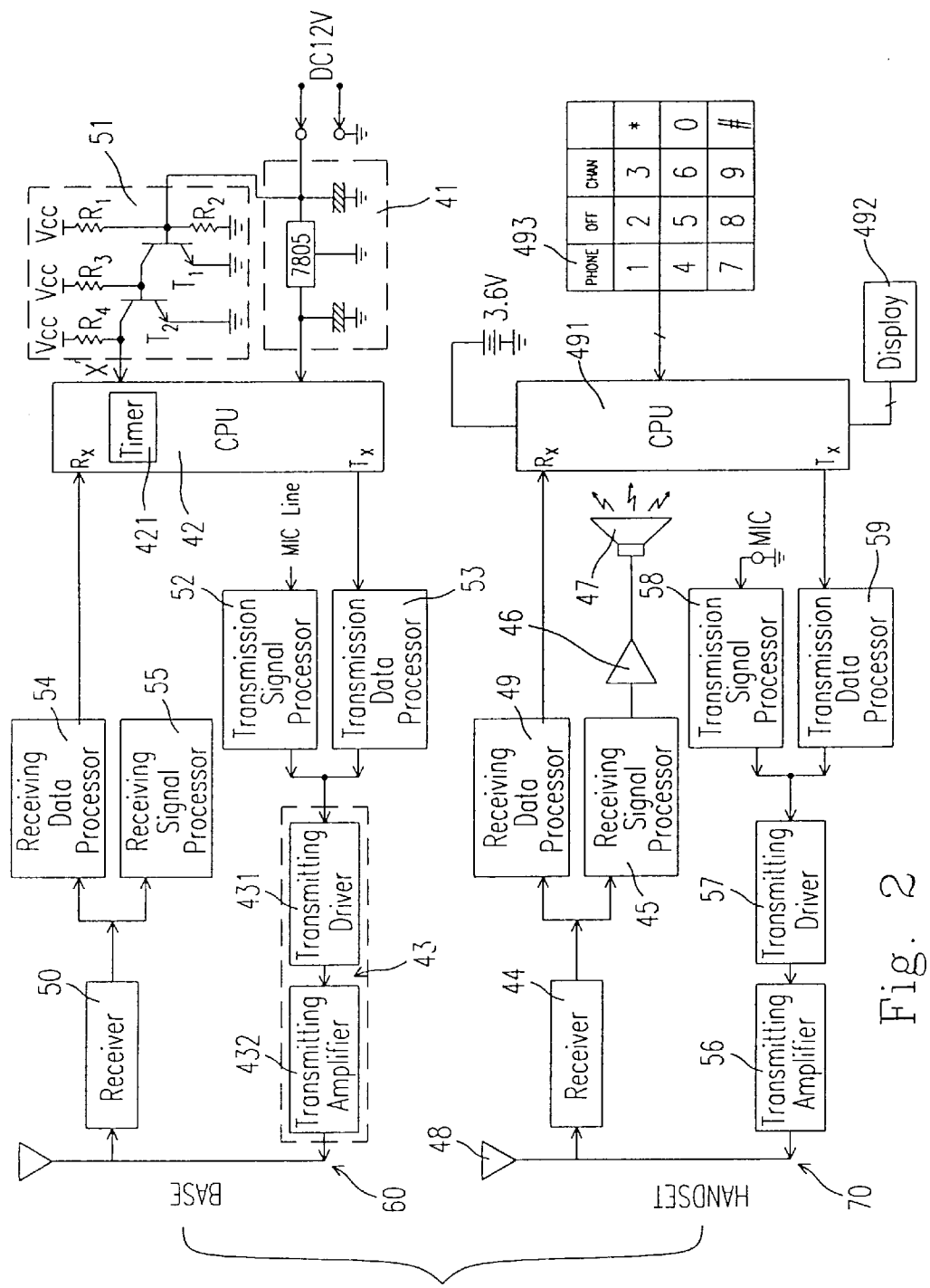
FIG. 2 is a block diagram showing a preferred embodiment of a communication system according to the present invention.

Referring now to FIG. 2, there is shown a preferred embodiment of a communication system, a radio telephone in this specific example, according to the present invention which includes in this specific embodiment a primary unit being a base 60 transmitting a first signal at a first instance, receiving a second signal at a second instance and energized by a power-stabilizing circuit 41 having a voltage level, a secondary unit being a handset 70 transmitting a third signal at a first instance, receiving a fourth signal at a second instance, and having a first communication mode and a second communication-shut mode, and a mode-changing device (51, 421) electrically connected to base 60 and enabling base 60 to generate a mode-changing signal to be received by handset 70 for changing handset 70 from the first communication mode into the second communication-shut mode when the voltage level falls below a specific value. Base 60 includes power-stabilizing circuit 41 for avoiding a power noise, a digital controller or central processing unit (CPU) 42 having a timer 421, a radio frequency transmitting module 43 including a transmitting driver 431 and a transmitting amplifier 432, a transmission signal processor 52 for processing the audio signal, a transmission data processor 53 for processing the control instructions, a receiving data processor 54, a receiving signal processor 55, a receiver 50 and a power detector 51. Likewise, handset 70 includes a filering receiver 44, a receiving signal processor 45 for processing an audio signal, an amplifier 46, a speaker 47, an antenna 48, a receiving data processor 49 for processing a control command, a transmitting amplifier 56, a transmitting driver 57, a transmission signal processor 58, a transmission data processor 59, a digital controller or CPU 491, a display 492 and a keypad 493.

The mode-changing device includes a power detector 51 electrically connected to power stabilizing circuit 41 for detecting its voltage level, and outputting a first voltage, e.g. a working voltage for base 60 when the voltage level is higher than the specific value and a second voltage, e.g. 0 when the voltage level is lower than the specific value, and timer 421 which begins to count a time period during which the voltage level is kept below the specific value.

Detector 51 includes transistors and resistors. The base voltage of the transistor T1 is controlled by the DC source (12V). When there is a normal power source, the base voltage of transistor T1 is high and thus transistor T1 becomes saturated which means its collector voltage is approximately equal to a ground potential. Meanwhile, the base voltage of the transistor T2 is low and thus transistor T2 is cut off which means that its collector voltage is Vcc so that detector 51 has a high output which means that base 60 is under a normal working condition. On the contrary, detector 51 will have a low output when the power source voltage is lowered which means that base 60 has an abnormal working condition. At this time, detector 51 will send such abnormal signal to CPU 42 which will control timer 421, capable of being built in CPU 42, to count a time period during which detector 51 has a low output. If that time period is counted up, it means that base 60 has a power failure or an interrupted power so that a mode-changing control signal, e.g. a reset signal is transmitted from the radio frequency transmitting module 43 through antenna 48 to handset 70 to be received by receiver 44 for transmission through filtering and decoding transmission data processor 49 to CPU 491 for ascertaining whether it is a mode-changing signal. After handset 70 is changed from the communication mode into the communication-shut mode in which no receiving signal is processed by transmission signal processor 45, the user will hear no unpleasant noise and can know from display 492 that base 60 has a power failure or an interrupted power.

Figure 3A:
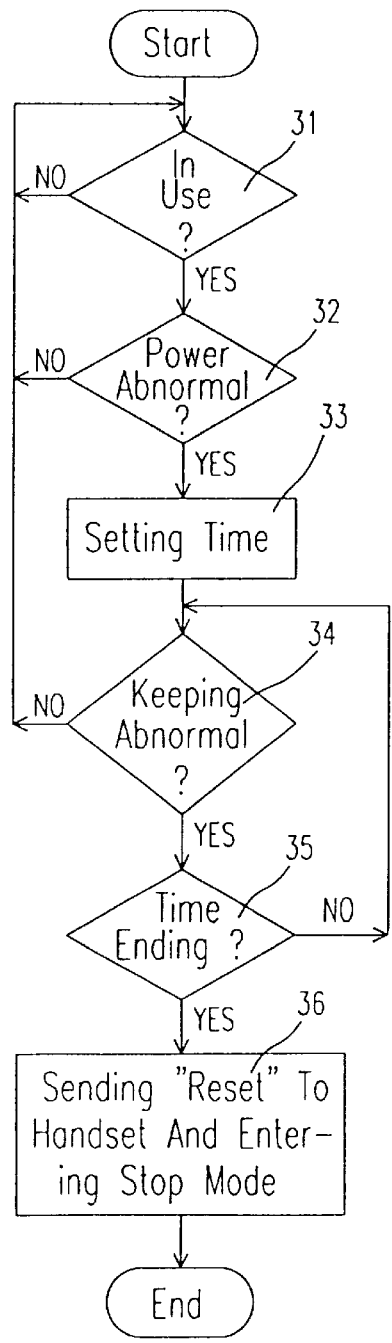
FIGS. 3A & 3B are working flow charts respectively for the base and the handset of a radio telephone according to the present invention.
Figure 3B:
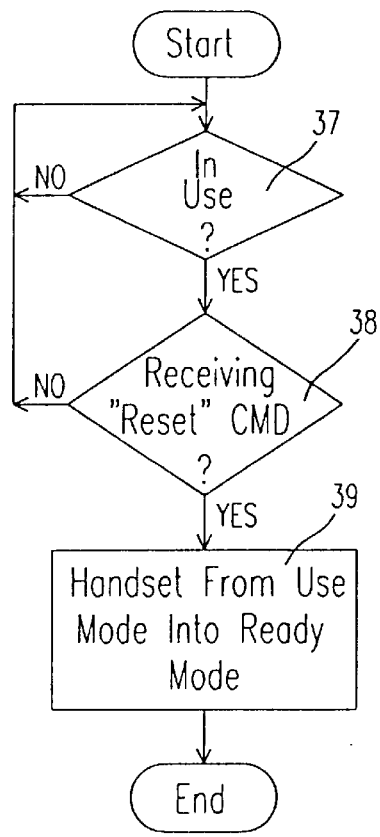

The working flow charts according to the present invention will be described with reference to FIGS. 3A & 3B respectively for base 60 and handset 70. The working steps for base 60 will be described as follows. At first, check whether the telephone is in a talk mode (31). If yes, keep on checking whether detector 51 has an abnormal output (32)? If there is an abnormal detector output, CPU 42 sets a time period T(33) during which the abnormal detector output continues and timer 421 counts (34). Check whether time period T is ended (35) which means base 60 has a power failure or an interrupted power? If yes, send the mode-changing radio frequency signal or the "reset" signal to handset 70 and enter into a stop mode before the power source for base 60 is exhausted (36).

So far as handset 70 is concerned, the working steps are as follows. At first, check whether handset 70 is in use (37)? If yes, check whether a "reset" command is received (38)? If yes, CPU 491 will change handset 70 from a communication mode (or use mode) into a communication-shut mode (or stand-by mode) (39) and display such message on display 492 or sound such message by means of speaker 47.

Figure 4:
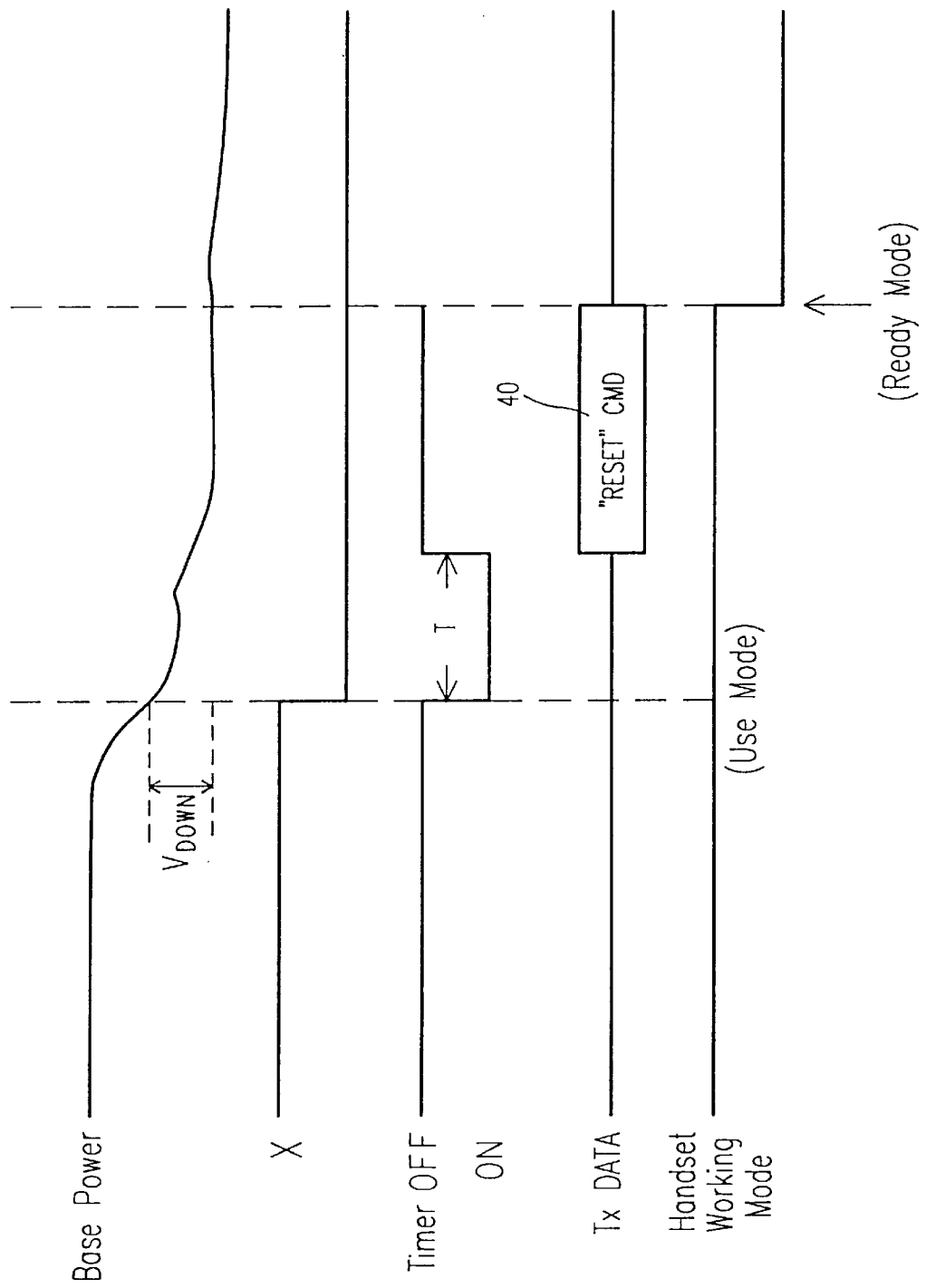
FIG. 4 is a time sequence plot for a communication system in FIG. 2.

As shown in FIG. 4 showing a time sequence control diagram according to the present invention for a radio telephone in FIG. 2. When the base power voltage falls below a specific voltage, $V_{DOWN}$, indicating there is an abnormal power source, the detector output X will change from a higher voltage into a lower voltage to so inform CPU 42. At the same time, timer 421 will begin to count the time period T. Once time period T is counted up, CPU 42 will send a "reset" command through a data output end $T_X$ DATA to transmitting module 43 for being converted into a radio frequency to be transmitted to handset 70 to be decoded. Handset 70 will thus change from a use mode into a stand-by mode. A mode-changing method according to the present invention for a communication system including a primary unit 60 transmitting a first signal at a first instance, receiving a second signal at a second instance and energized by a power source (41, 51) having a voltage level, a secondary unit 70 transmitting a third signal at a first instance, receiving a fourth signal at a second instance, and having a first communication mode and a second communication-shut mode includes a) detecting the voltage level by detector 51, b) generating a mode-changing signal when the voltage level falls below a specific value, $V_{DOWN}$, and c) changing secondary unit 70 from the first communication mode into the second communication-shut mode in response to the mode-changing signal. While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A communication system comprising:
   a primary unit having a first transmitter for transmitting a first signal at a first instance and a first receiver for receiving a second signal at a second instance, said primary unit being adapted to be energized by a power source having a predetermined voltage level, said primary unit including a mode-changing device coupled to said first transmitter and adapted for monitoring said predetermined voltage level, said mode-changing device generating a mode-changing signal responsive to said predetermined voltage level falling below a specific value, said mode-changing signal being transmitted by said first transmitter at a third instance; and, a secondary unit having a second transmitter for transmitting said second signal at said second instance and a second receiver for receiving said first signal at said first instance and said mode-changing signal at said third instance, said secondary unit having a first communication mode and a second communication mode, said second communication mode being a shutdown mode, said secondary unit including means coupled to said second receiver for changing said secondary unit from said first communication mode to said shutdown mode responsive to said receipt of said mode-changing signal.

2. A communication system according to claim 1 wherein said mode-changing device includes a power detector electrically connected to said power source for detecting said voltage level, and outputs a first voltage when said voltage level is higher than said specific value and a second voltage when said voltage level is lower than said specific value.

3. A communication system according to claim 2 wherein said mode-changing device further includes a timer which begins to count a time period during which said voltage level is kept below said specific value.

4. A communication system according to claim 3 wherein said unit transmits said mode-changing signal to said secondary first transmitter when said timer has counted up said time period.

5. A communication system according to claim 1 wherein said secondary unit further includes a display for displaying said secondary unit is in said communication-shut mode.

6. A communication system according to claim 1 wherein said primary unit is a base of a radio telephone and said secondary unit is a handset of said radio telephone.

7. A mode-changing method for a communication system including a primary unit having a transmitter and a receiver and adapted to be energized by a power source having a voltage level, and a secondary unit having a transmitter and a receiver and having a first communication mode and a second communication mode, said second communication mode being a shutdown mode, said method comprising:

a. detecting said voltage level in said primary unit;

b. generating a mode-changing signal when said voltage level falls below a specific value;

c. transmitting said mode-changing signal from said transmitter of said primary unit;

d. receiving said mode-changing signal by said receiver of said secondary unit; and, e. changing said secondary unit from said first communication mode to said second shutdown mode in response to said receipt of said mode-changing signal.

* * * * *